United States Patent [19]
Hill

[11] Patent Number: 5,818,138
[45] Date of Patent: Oct. 6, 1998

[54] PERMANENT MAGNET ELECTRIC MACHINE WITH HARD-MAGNETIC AND SOFT-MAGNETIC SEGMENTS

[76] Inventor: Wolfgang Hill, D-76135 Karlsruhe, Germany

[21] Appl. No.: 405,195

[22] Filed: Mar. 16, 1995

Related U.S. Application Data

[63] Continuation of PCT/EP93/02676 Sep. 30, 1993.

[51] Int. Cl. $^6$ ..................................................... H02K 21/00
[52] U.S. Cl. ........................... 310/152; 310/156; 310/179; 310/261
[58] Field of Search .................................... 310/156, 179, 310/261, 152

[56] References Cited

U.S. PATENT DOCUMENTS

| | | | |
|---|---|---|---|
| 4,642,502 | 2/1987 | Carpenter et al. | 310/156 |
| 4,973,872 | 11/1990 | Dohogne | 310/156 |
| 5,302,876 | 4/1994 | Iwamatsu et al. | 310/156 |
| 5,345,129 | 9/1994 | Molnar | 310/156 |
| 5,397,951 | 3/1995 | Uchida et al. | 310/156 |
| 5,485,045 | 1/1996 | Canders et al. | 310/156 |

*Primary Examiner*—Thomas M. Dougherty
*Assistant Examiner*—Elvin G. Enad

[57] ABSTRACT

In known permanent magnet electric machines with a radial air gap, intersecting phase conductors are deflected only into the space arranged axially in front of the slotted soft magnetic body. By separating the body (13) which is equipped with permanent magnets into segments which may be radially placed into the winding (15), the winding overhangs may expand into the space located axially in front of the permanent magnets and their soft magnetic yokes. The radial overall length of the machine is thus reduced and its efficiency and power density are increased because of the shorter conductive paths in the winding overhangs. In addition, manufacture, dismantling, and magnetizing of the magnets is simplified.

7 Claims, 2 Drawing Sheets

PERMANENT MAGNET ELECTRIC MACHINE WITH HARD-MAGNETIC AND SOFT-MAGNETIC SEGMENTS

This is a continuation of International Application PCT/EP93/02676, with an international filing date of Sep. 30, 1993, now abandoned.

BACKGROUND OF THE INVENTION

1. Field of the Invention

The invention concerns a permanent magnet electric machine with a radial air gap and intersecting phase conductors as well as a process for manufacturing such a machine.

2. Description of the Prior Art

Permanent magnet electric machines, particularly, if they are of a brushless design with a high number of poles and intersecting phase conductors, attain highest power densities. However, intersecting of the conductors of different phases increases the portion of the conductor located in the winding overhangs which causes a decrease of power density and efficiency.

German Patent No. 1,056,253 describes a permanent magnet electric machine with radial air gaps in which the segmented internal rotor is equipped with permanent magnets, the poles of said magnets that face each other having the same polarity and the pole flanges of said magnets being separated in the direction of the circumference. During assembly of the rotor the last segment is inserted radially from the outer surface or axially and fixed in concentric configured grooves by means of a wedge.

The invention is based on the objective to advance the development of a permanent magnet radial air gap machine with intersecting phase conductors in such a manner that the efficiency and the power density is increased.

SUMMARY OF THE INVENTION

In accordance with the invention, this objective is achieved by separating the body which is equipped with permanent magnets into segments which can be inserted into and removed from a winding at any time and in which the intersecting phase conductors also utilize radially the available space on the plane of the air gap, the permanent magnets, and their yokes to the current conduction, by which, in turn, a decrease in the length of the conductor in the winding overhangs, and consequently, an increase in the power density and efficiency is achieved.

In segmenting the magnet-equipped body, only one structural design of the segment is required, if the magnets are arranged radially outside the air gap, while, if the magnets are arranged inside the air gap, two structural segment designs are required, in order that, in this configuration, the tangential width of the segment to be inserted last can decrease with an increasing radius or can remain constant. Because of the small outer dimensions and large unit number of segments, automation of production is simplified.

The drawings present advantageous embodiments of the invention.

DETAILED DESCRIPTION OF THE PREFERRED EMBODIMENT

Figure 1:
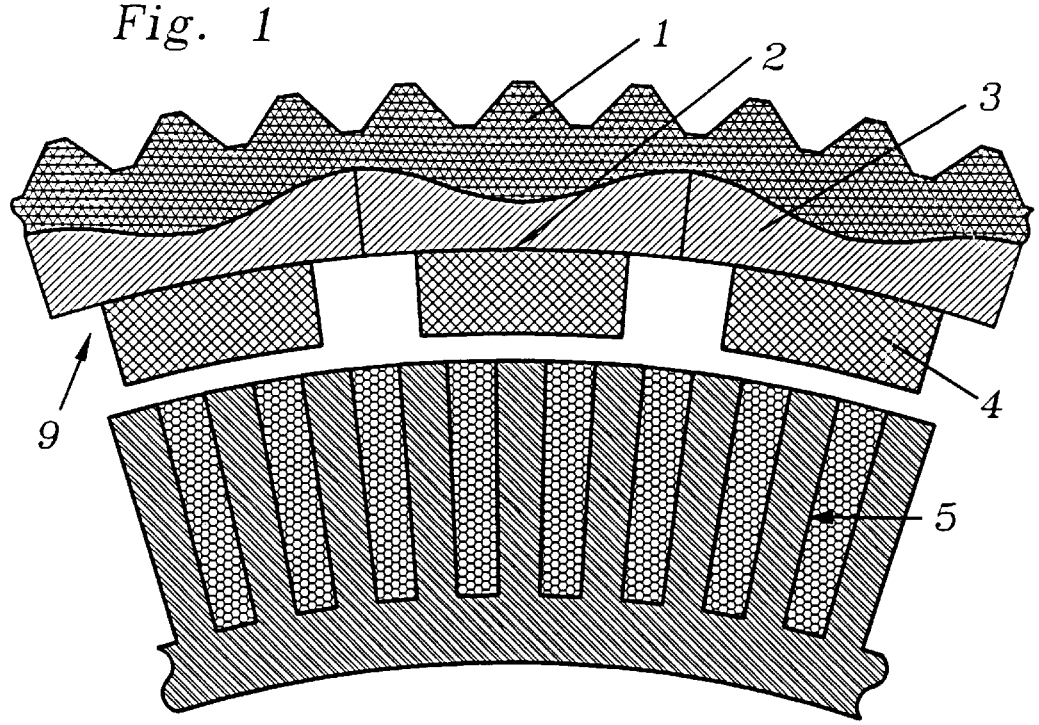
FIG. 1 shows a cutout from the cross section of a permanent magnet motor with external rotor and carrier ring.

FIG. 1 shows a permanent magnet motor with external rotor, the housing of which is designed as a toothed gear and, concurrently functioning as carrier ring (1), fixes radially the hard and soft magnetic rotor segments (2). The varying radial extension of the rotor segments (2) and the carrier ring (1) create an interface that is undulating periodically toward the pole pitch. The segmented design of the soft magnetic rotor body (3) allows for the glued-on magnets (4)—as part of the rotor segments (2)—to be placed axially and inserted radially between the winding overhangs of a winding (5). After sliding off of the carrier ring (1) the poles of the magnets (4) are individually accessible and can be tested, magnetized or exchanged separately.

Figure 2:
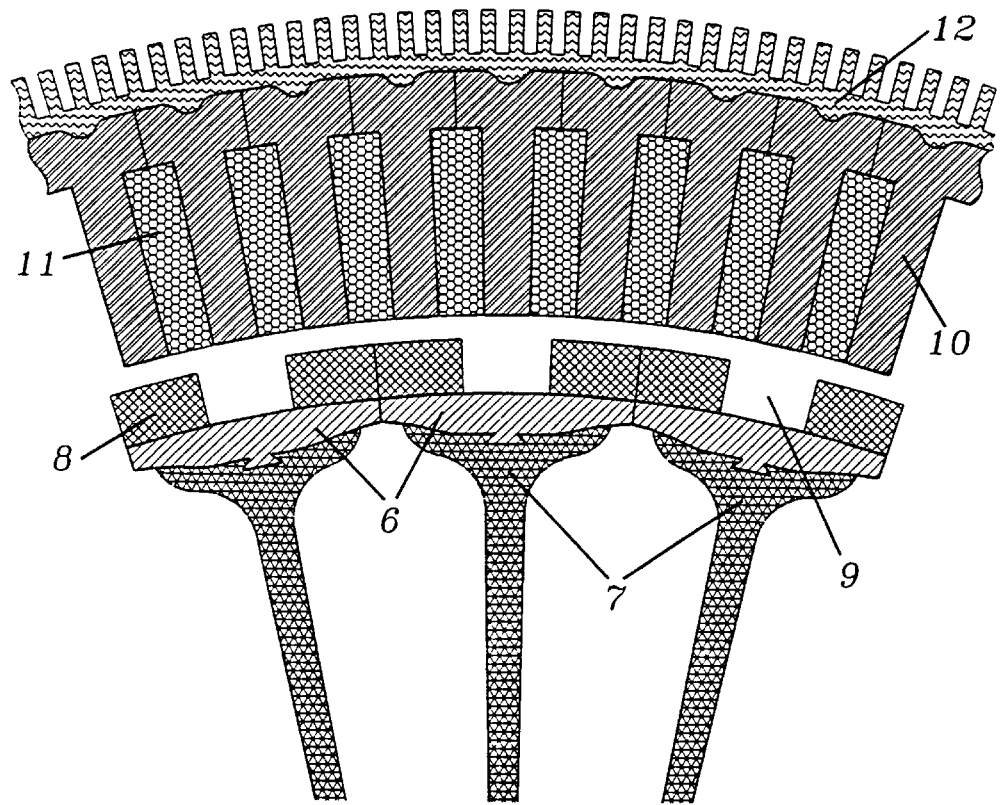
FIG. 2 shows a cutout from the cross section of a permanent magnet motor with internal rotor carrier segments.

FIG. 2 shows a permanent magnet motor with internal rotor, the rotor segments (6) of which are fixed in their position by T-shaped carrier segments (7). In annular machines the carrier segments transmit the torque to a shaft, the diameter of which is distinctly smaller than the inner diameter of the rotor segments. After insertion of the last rotor segment (6) the rotor parts are pulled radially inwards which creates a stable construction with small impact gaps. Because the permanent magnet magnetic flow density reaches a minimum in the tangential middle of the magnetic poles (8), the rotor segments (6) begin and terminate in the direction of the circumference instead of the pole gap (9) in the tangential middle of the magnetic poles. The stator consists also of segments (10) which are positioned in a prefabricated 3-phase winding (11) and which are fixed by the housing (12) equipped with cooling gills.

Figure 3:
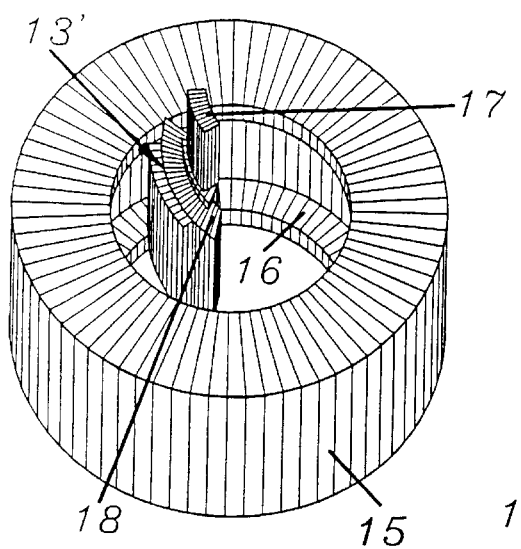
FIGS. 3 to 5 show assembly of hard and soft magnetic rotor segments (13,14) of the permanent magnet six-pole motor with internal rotor into a schematically depicted stator (15).
Figure 4:
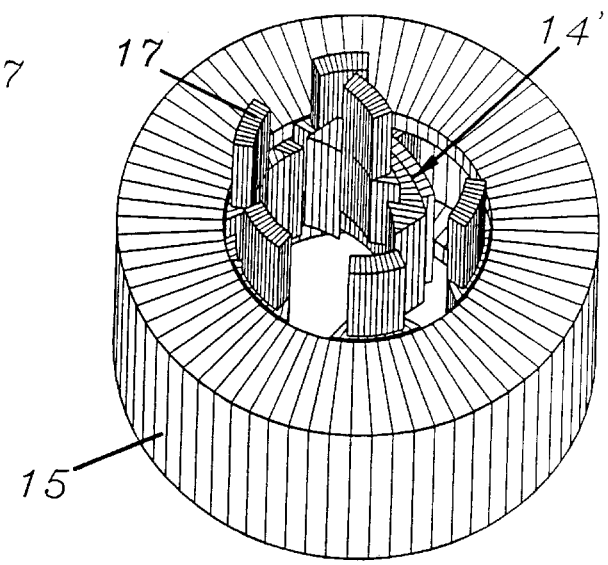
Figure 5:
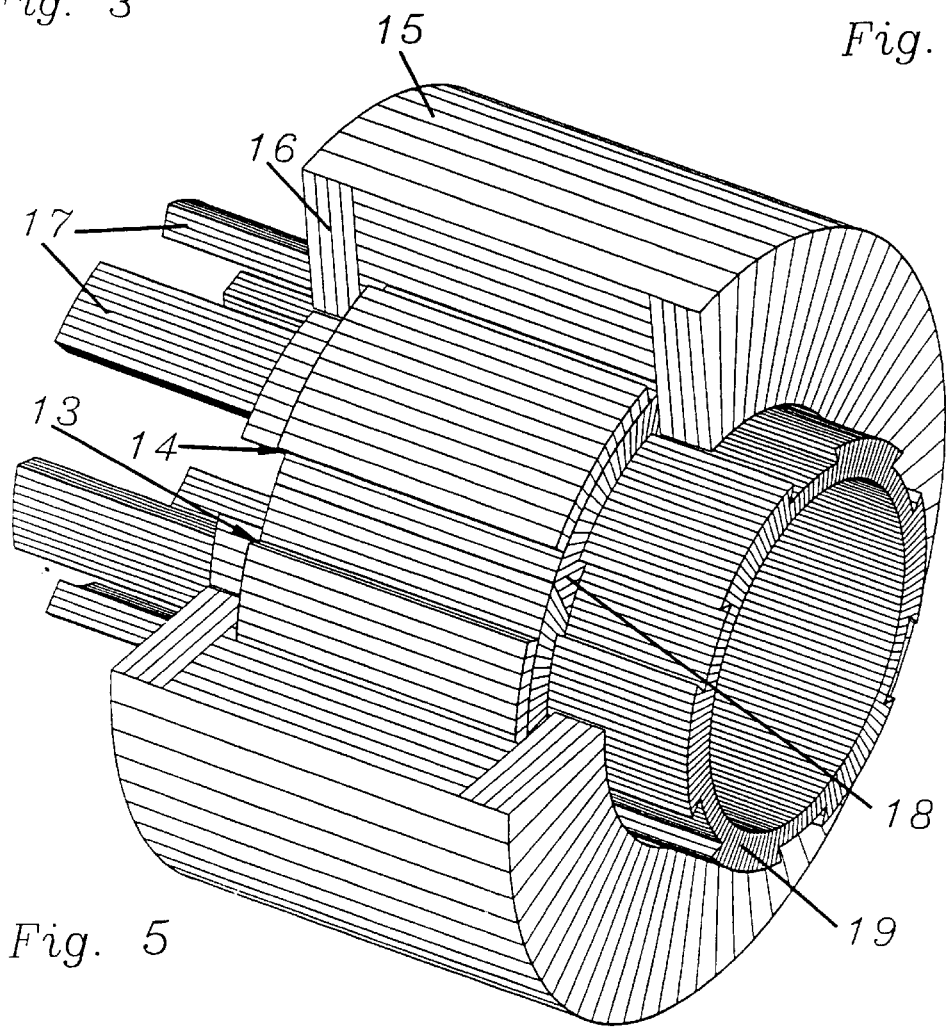

FIG. 3 shows the assembly of hard and soft magnetic rotor segments (13, 14) of a permanent magnet six-pole motor with internal rotor into a schematically depicted stator (15).

In FIG. 3a the first rotor segment (13') is inserted through the opening which is narrowed by the winding overhang (16). During assembly, the insertion tool (17) is holding the rotor segments in their position which is facilitated by inward directed raised sections 18 on the outer edges of the rotor segments. In addition, these raised sections increase the contact surface to adjoining segments and to the carrier ring (19) and concurrently cause the decrease of transition resistance for the magnetic flow and waste heat.

The insertion of the last rotor segment (14') in FIG. 3b is facilitated by the different contact angles of the tangential contact surfaces of the adjoining rotor segments (13, 14). This allows the insertion of the last rotor segment (14') of an internal rotor radially from the inside out.

For purposes of illustration of the rotor construction, a part of the ring-shaped stator (15) in FIG. 3c was removed. In the depicted final step of the assembly a carrier ring (19) which has been inserted from the opposite side assumes the holding function of the six insertion tools (17). Here, the grooves of the carrier ring grip the corresponding trapezoidal raised sections 18 and pull them inside.

I claim:

1. A permanent magnet electric machine with radial air gap and intersecting phase conductors which possess winding overhangs (16), the rotor or the stator of said machine being equipped with permanent magnets (4, 8) and being disassembled into magnetic segments (2, 6, 13, 14), said intersecting phase conductors being arranged opposite to the magnetic segments on the other side of said radial air gap, and in said winding overhangs (16) said phase conductors extending axially on both sides over the magnetic segments, wherein said magnetic segments consist of permanent magnets (4, 8) and soft magnetic parts (3) and wherein said magnetic segments (2, 6, 13, 14) lie in part axially within said winding overhangs (16).

2. The permanent magnet electric machine as recited in claim 1 wherein the segments (2, 13, 14) are fixed by a carrier ring (1, 19).

3. A permanent magnet electric machine as recited in claim 1, which possesses T-shaped carrier segments (7), the permanent magnets (4, 8) of said machine being arranged radially within the air gap, wherein the magnetic segments (6) are connected by said T-shaped carrier segments (7) to a shaft.

4. The permanent magnet electric machine as recited in claim 1, the permanent magnets thereof being arranged radially within the air gap, wherein adjoining segments (13, 14) possess different contact angles at their interfaces.

5. A permanent magnet electric machine as recited in claim 1, wherein the magnetic segments (13, 14) have tangential ends and possess radially raised sections (18) on said tangential ends.

6. A permanent magnet electric machine with radial air gap and intersecting phase conductors, the rotor or the stator thereof being equipped with permanent magnets (4, 8) and being disassembled into magnetic segments (2, 6, 13, 14), said intersecting phase conductors being arranged opposite to the magnetic segments on the other side of said radial air gap, and in said winding overhang (16) said phase conductors extending axially on both sides over the magnetic segments, wherein said segments consist of permanent magnets (4, 8) and soft magnetic parts (3), wherein said permanent magnets are radially fixed on said soft magnetic parts (3) and the tangential contact surfaces of said adjoining magnetic segments have different contact angles, and wherein the magnetic segments have a tangential width which changes in radial direction and wherein said tangential width of at least one segment is increased or is kept constant with a decreased radius.

7. A permanent magnet electric machine as recited in claim 6, wherein a carrier ring (1) or carrier segments (7) are fixing said magnetic segments (2, 6, 13, 14), wherein said magnetic segments are pressed together in tangential and radial direction by the carrier ring or carrier segments which are placed radially inside or outside.

* * * * *